(12) United States Patent
Wigmore et al.

(10) Patent No.: US 10,318,326 B1
(45) Date of Patent: Jun. 11, 2019

(54) INTERNAL DEDUPLICATION ENGINE LEVERAGING EMBEDDED VIRTUAL GUEST OPERATING SYSTEM

(71) Applicant: EMC Corporation, Hopkinton, MA (US)

(72) Inventors: Ian Wigmore, Westborough, MA (US); Arieh Don, Newton, MA (US); Stephen Smaldone, Woodstock, CT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 650 days.

(21) Appl. No.: 14/981,560

(22) Filed: Dec. 28, 2015

(51) Int. Cl.
*G06F 9/455* (2018.01)
*G06F 16/215* (2019.01)
*G06F 16/25* (2019.01)
*G06F 16/23* (2019.01)

(52) U.S. Cl.
CPC ...... *G06F 9/45558* (2013.01); *G06F 9/45545* (2013.01); *G06F 16/215* (2019.01); *G06F 16/2365* (2019.01); *G06F 16/258* (2019.01); G06F 2009/45583 (2013.01)

(58) Field of Classification Search
CPC ............ G06F 9/45558; G06F 9/45545; G06F 17/30303; G06F 17/30371; G06F 17/30569; G06F 16/215; G06F 16/258; G06F 16/2365
USPC ...................................................... 707/692
See application file for complete search history.

(56) References Cited

U.S. PATENT DOCUMENTS 9,389,887 B1 * 7/2016 Aron .................. G06F 9/45533

* cited by examiner

*Primary Examiner* — Kimberly L Wilson
(74) *Attorney, Agent, or Firm* — WOMBLE BOND DICKINSON (US) LLP (57) ABSTRACT

Systems and methods are disclosed for associating one or more storage-based services with a storage unit accessible by a primary "tier 1" storage device. A storage-based service can include deduplication, compression, data conversion, statistical analysis of the data to be stored, or other storage-based service. A storage unit can be a disk, a file, a virtual disk, or a logical unit of storage (LUN). A virtual machine within the primary "tier 1" storage can perform the one or more storage-based services associated with the storage unit.

18 Claims, 8 Drawing Sheets

INTERNAL DEDUPLICATION ENGINE LEVERAGING EMBEDDED VIRTUAL GUEST OPERATING SYSTEM

TECHNICAL FIELD

This disclosure relates to the field of efficiently storing data to a primary storage system in a virtual environment.

BACKGROUND

A virtual machine in a virtual computing infrastructure can run on a host device that comprises physical hardware and virtualization software. One or more applications that can run within the virtual machine can generate data that may be stored on one or more virtual disks. Virtual disks can be implemented on a primary storage system such as a storage array (or, storage appliance) having a substantial number of disks. Current storage array capacities can be up to many terabytes, several petabytes, or more. But, the increased primary storage system capacity comes with increased costs. Costs can include the cost of the disks, CPUs and memory to manage the disks that store the data, the power required to operate and cool the disks, and the cost of the storage space to house the disks. In addition, when it is time to backup the primary storage system, the original data on the primary storage system must be transmitted to a backup server, further increasing the cost of the data.

The size of the data stored on a primary storage system can be reduced using compression and/or deduplication. Requiring a virtual machine to compress its own data before writing the data to a primary storage system requires processing overhead that would reduce end-user performance. Currently, deduplication is limited to implementations on backup servers and target storage devices used for backup. Deduplicating on a backup server incurs the cost of transmitting all of the original data from the primary storage system to the backup server or target storage.

BRIEF DESCRIPTION OF THE DRAWINGS

Embodiments of the invention are illustrated by way of example, and not by way of limitation, in the figures of the accompanying drawings in which like reference numerals refer to similar elements.

In the following description of the figures, the inventive concepts herein have been described with respect to a SCSI transport implemented using a Fibre Channel protocol. However, the disclosure is not to be construed as limited to a SCSI transport over Fibre Channel protocol. A SCSI transport can be implemented over a wide variety of protocols including iSCSI, Fibre Channel over Ethernet (FCoE), or Infiniband. Communication within the primary storage system need not be implemented using SCSI. Storage devices and internal components can be communicatively coupled via ATA, SCSI, serially-attached storage, USB, Firewire, an I/O bus, or other communication channel.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for performing one or more storage-based services by a primary "tier 1" storage system ("primary storage system") on data to be written to a storage unit within the primary storage system. In an embodiment, the primary storage system forms a part of a federated tiered storage system. In embodiment, the one or more storage-based services can include deduplication, compression, language translation, statistical analysis of the data to be written, or other storage-based service. In an embodiment, a service can include a service virtual machine determining that data stored on the primary storage system is older than a predetermined time limit, and the service virtual machine can read the data, compress and/or deduplicate the data, and store the data to a storage unit. In an embodiment, the compressed or deduplicated data can be stored to a different storage unit than the storage unit on which the data was previously stored. In an embodiment, storing the compressed and/or deduplicated data to a different storage unit can comprise change storage tiers. Data can be received from a host computer ("client") at the front-end of the primary storage system. One or more processes running on the primary storage system can process the received data using the storage-based service(s) before writing the data to a storage unit. In an embodiment, the primary storage system can comprise a virtualization layer that can instantiate one or more virtual machines that implement the processes that perform the storage-based services.

In an embodiment, the back end of the primary storage system can be coupled to additional, external tier 1 storage, or additional tiers of storage, ("external tiers of storage"). Disks within the primary storage system and disks within the external tiered storage can be consumed by one or more disk directors of the primary storage system that can encapsulate a storage unit of a tiered storage device as a storage unit within the primary storage system. One or more of these storages can be assigned to a host pool of storages or a service pool of storages. Each storage in the service pool of storages can be associated with one or more storage-based services, and a service virtual machine to perform the one or more services, before being made available to the host pool. Storages within the host pool comprise storages associated with a storage-based service, and those that are not associated with storage based service. A client can choose which type of storage to access, based upon the client's need for the one or more storage-based services associated with a particular storage in the host pool.

Any of the methods described herein can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
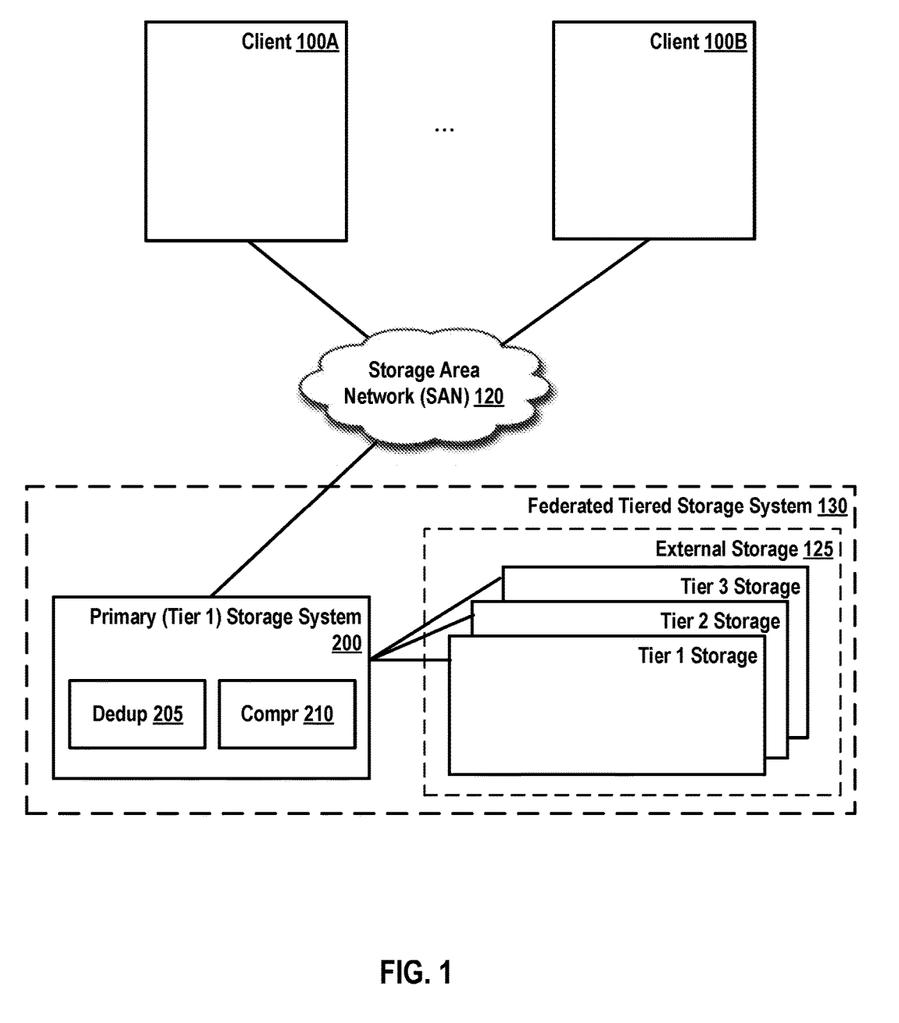
FIG. 1 illustrates, in block diagram form, an overview of a virtual infrastructure for a federated tiered storage system that includes a primary "tier 1" storage that offers one or more storage-based services, such as data deduplication and/or data compression, before writing data to a storage unit in the primary storage system, in accordance with some embodiments.

FIG. 1 is a block diagram illustrating an infrastructure comprising a federated tiered storage system 130 ("FTS") in which a plurality of clients 100A and 100B read and write data to the FTS 130. The FTS 130 can include a primary "tier 1" storage system 200, an external "tier 1" storage, an external tier 2 storage, and an external tier 3 storage (collectively, "external tiered storage 125"). External tier 1 storage can be a storage appliance. In an embodiment, external tier 1 storage can be manufactured by a third-party vendor. External tier 2 storage can include storage such as CD-ROMs, DVD-ROMs, flash memory, or other storage type. External tier 3 storage can comprise magnetic tape, removable storage media, or other slower, less-frequently used storage type. External tiered storage can be coupled to primary tiered storage system 200 by a Fibre Channel, Ethernet, USB, or other high-bandwidth communication channel. Primary storage system 200 can communicate with a client 100A or 100B using SCSI commands packaged in one or more Fibre Channel (FC) Frames. One or more client systems 100A-100B can be communicatively coupled by a storage Area Network 120 with the FTS 130. In an embodiment, Storage Area Network 120 can comprise a Fibre Channel network wherein a client can be a host computer having a Fibre Channel adapter, or a virtual machine running on the host computer having a Fibre Channel adapter ("clients"). Storage area network 120 can also be implemented with Ethernet. Clients 100A-100B can communicate over storage area network 120 using a variety of protocols, include Internet Small Computer Systems Interface (iSCSI), Fibre Channel over Ethernet (FCoE), AT Attachment, (ATA), Enhanced Integrated Drive Electronics (EIDE) or other protocol. Primary storage system 200 can be primary storage for client systems 100A-100B, and/or for virtualized clients hosted by client systems 100A-100B. In an embodiment, primary storage system 200 can be exposed to virtualized clients as one or more SCSI disk drives in a virtual file system.

Primary storage system 200 can include one or more storage-based services associated with a storage unit within the primary storage system 200. A storage unit can refer to a physical disk, a virtual disk, or a storage logical unit number (LUN). Storage-based services can include deduplication, compression, data conversion, statistical analysis of data to be stored in a storage unit, or other storage-based service.

Primary storage system 200 can import disks and other media types from external tiered storage 125 as storage units. The imported storage units can be associated with one or more storage-based services and exposed to client devices 100A and 100B as available storage units. Imported storage units can also be exposed to clients 100A and 100B as storage units without an associated storage-based service. Thus, a client 100 that wants a particular storage-based service performed on data to be written can access a storage unit that has the associated storage-based service available.

A client 100 can be any type of client such as a personal computer (e.g., desktops, laptops, and tablets), a workstation, a handheld device, a Web-enabled appliance, a gaming device, a media player, or a mobile phone (e.g., Smartphone), or any computing system operable to communicate over a storage area network 120. An exemplary client 100 is described below with reference to FIG. 9.

SCSI requests can be sent from clients 100A-100B and received at the primary storage system 200 via the storage area network 120. Storage area network 120 can be any type of network using Fibre Channel protocol. The network 120 can feature any suitable network topology. Thus, the network 120 can be a point-to-point network. Alternatively, the network 120 can be an arbitrated loop network. In another embodiment, the network 120 can be a switched fabric network. In such embodiments, the network 120 can include one or more Fibre Channel switches (not shown) and visibility of the target storage 200 and/or clients 100A-100B can be controlled with Fibre Channel zoning.

As shown in FIG. 1, client 100 is coupled with a primary storage system 200 that can be further coupled to external tiered storages 125, such as Tier 1, Tier 2, and Tier 3 storages. Primary storage system 200 can be implemented locally (e.g., single-node operating environment) or remotely (e.g., multi-node operating environment) via an interconnect (not shown), which can be a bus or a network. In one embodiment, one of the storage devices 200 operates as an active storage unit to receive and store external or recently used data, while the other storage unit operates to periodically archive data from the active storage unit according to an archiving policy or scheme. A primary storage system 200 comprise, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. The primary storage system 200 can also comprise combinations of such storage devices. In some embodiments, primary storage system 200 can be organized into one or more volumes of Redundant Array of Inexpensive Disks (RAID).

Primary storage system 200 can comprise a storage appliance having many internal disk drives coupled via a SCSI interface, and further including an operating system, a deduplication service 205, a compression service 210, other storage-based services (not shown), one or more hardware processors, memory, a SCSI over Fibre Channel protocol stack, a Fibre Channel adapter, and logic to import storage units from external tiered storage 125. A primary storage system 200 is described in further detail with respect to FIGS. 2 and 3, below.

Figure 2:
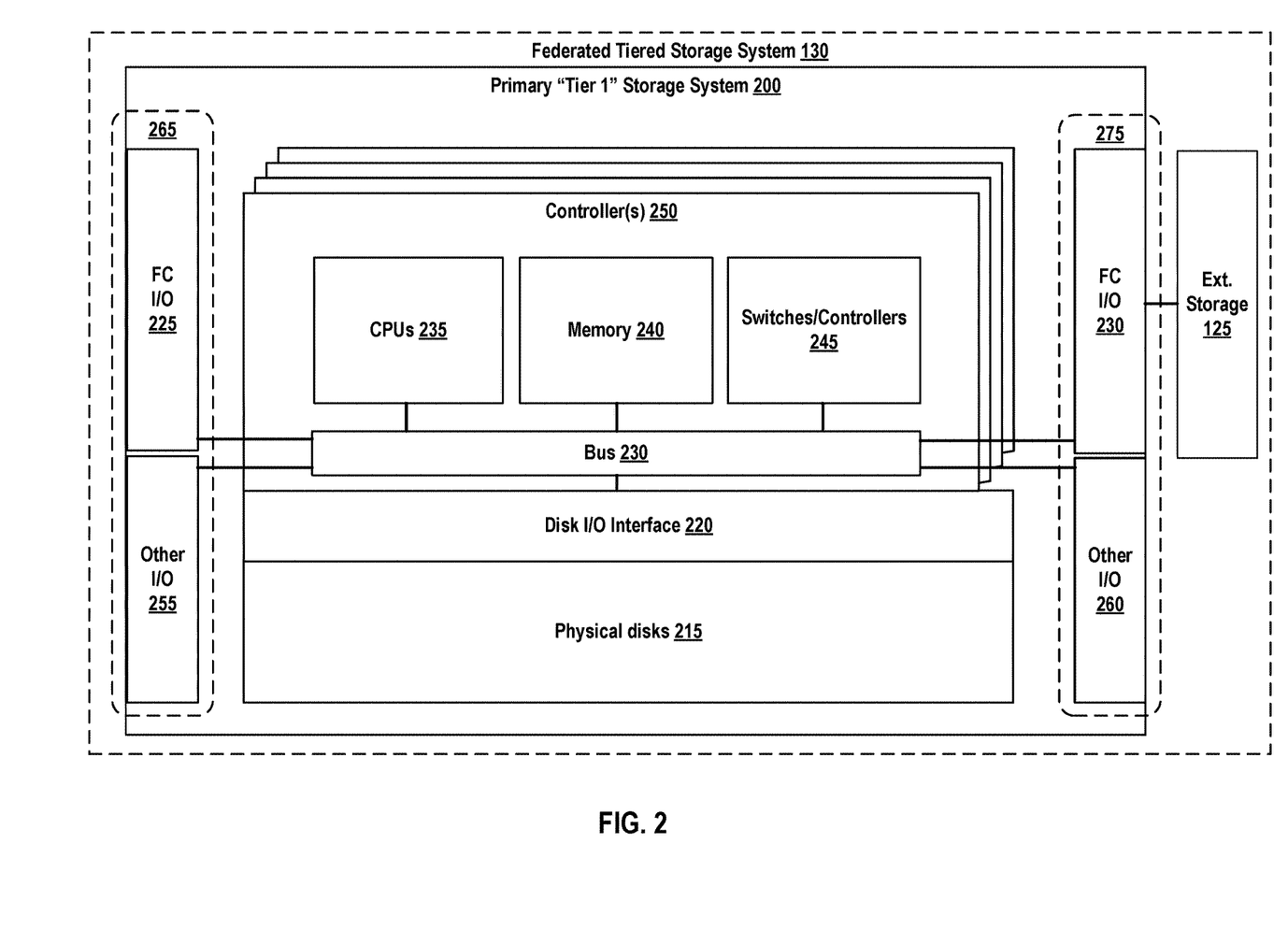
FIG. 2 illustrates, in block diagram form, a detailed view of a primary "tier 1" storage that offers one or more storage-based services, such as data deduplication and/or compression, before writing data to a storage unit in the primary storage system, in accordance with some embodiments.

FIG. 2 illustrates, in block diagram form, a detailed view of a hardware within a primary "tier 1" storage system 200 that offers one or more storage-based services, such as data deduplication and/or compression, before writing data to a storage unit in the primary storage system 200, in accordance with some embodiments. Functionality of the hardware described in FIG. 2 is described with reference to FIG. 3, below.

A federated tiered storage system 130 can comprise a primary "tier 1" storage system 200 and one or more external storages 125.

A primary storage system 200 can comprise a physical disks 215, disk I/O interface 220, one or more controllers 250, a front end 265, and a back end 275.

Physical disks 215 can include a plurality of physical disks. In an embodiment, the disks are arranged in RAID groups. Physical disks can include hard disks (HDD), solid-state disks (SSD), CD-ROMs, DVD-ROMs, flash memory, or other storage media. In an embodiment, physical disks 215 can comprise hundreds of terabytes (TB) or many petabytes (PB) of storage capacity. Physical disks 215 can be coupled via a small computer system interface (SCSI).

Physical disks 215 can communicate with the one or more controllers 250 via a disk input/output (I/O) interface 220 such as a serial-attached SCSI ("SAS") interface, FireWire, USB, Ethernet, Fibre Channel, or other high-speed communication bus and protocol.

Primary storage system controller(s) 250 can include CPUs 235, memory 240, bus 230, and switches/controllers 245. CPUs can be general purpose or special purpose CPUs, such as a GPU, math co-processor, digital signal processor (DSP), or other special purpose processor type. CPUs can be parallel processors, pipelined processors, multi-core processors, or other processor architecture. Memory can include dynamic RAM, static RAM, read-only memory (ROM), flash memory, or other memory types. Switches/controllers 245 can include multiplexors, demultiplexors, internal routers, programmable gate arrays, and switches, to generate signal a signal path between components and devices within controller 250. Bus 230 can be a high-speed bus that interconnects components of the controller 250, front end 265, back end 275, and disk I/O interface 220. Memory 240 can store instructions that, when executed by one or more hardware CPUs 235, implement a virtualization environment that supports one or more virtual machines having a guest operating system, Fibre Adapter directors, Disk directors, deduplication, compression, data conversion, statistical analysis of data from a host, and other storage-based services.

Front end 265 can comprise a plurality of Fibre Channel ports 225 that interface with a plurality of clients 100. Fibre Channel ports 225 can have a Fibre Channel switching matrix that configures one or more Fibre Channel ports to access one or more corresponding data paths within controller 250. Front end other I/O 255 can include Ethernet ports, optical network ports, USB ports, and other communication ports that interface to client devices 100. Back end 275 can comprise a plurality of Fibre Channel ports 230 that interface to one or more external storages 125. Fibre Channel ports 230 can have a Fibre Channel switching matrix that configures one or more Fibre Channel ports to access one or more corresponding data paths within controller 250. Back end other I/O 260 can include Ethernet ports, optical network ports, USB ports, and other communication ports, including serially-attached storage (SAS) that interface to external storages 125.

Figure 3:
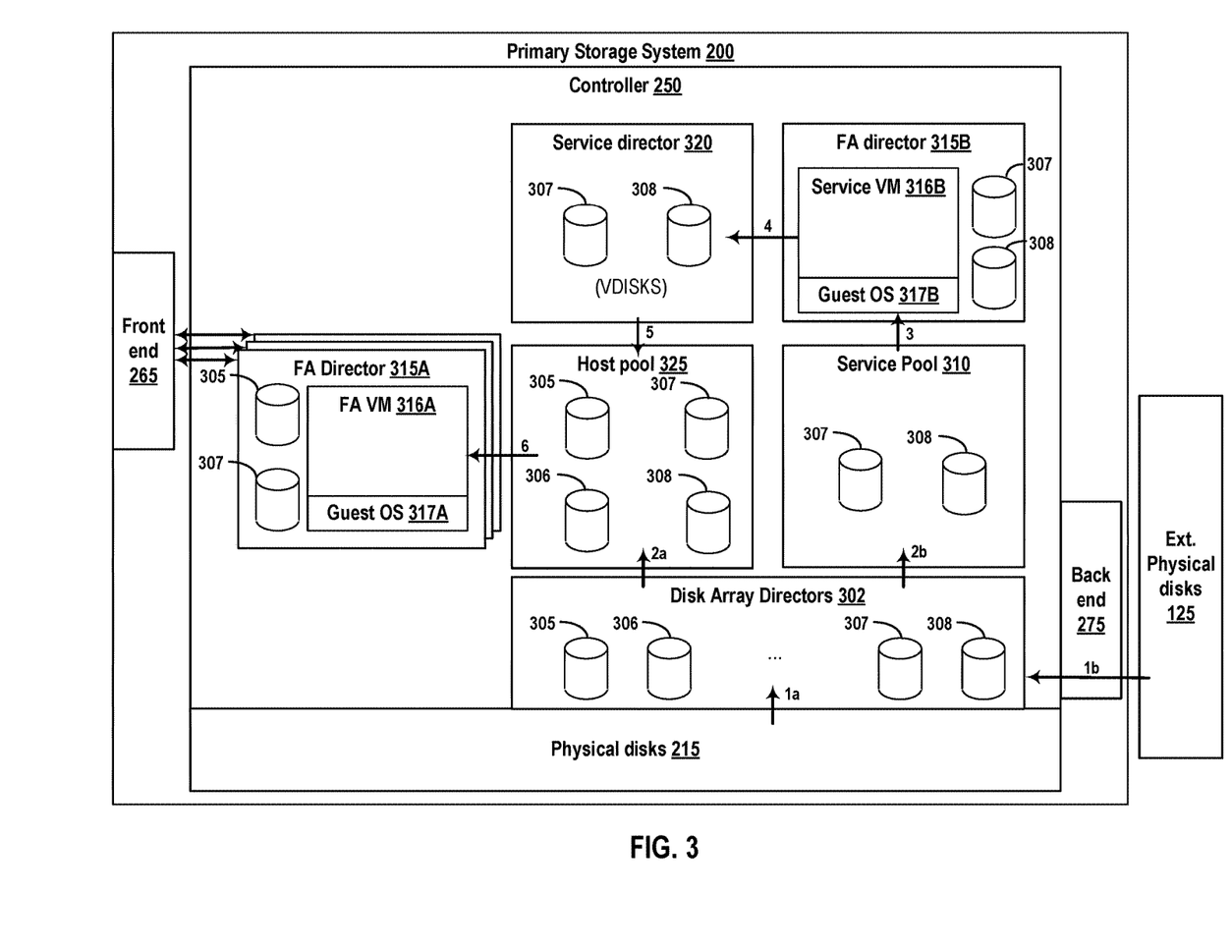
FIG. 3 illustrates, in block diagram form, a flow of storage component instantiation and abstraction, of a primary "tier 1" storage that offers one or more storage-based services, such as data deduplication and/or data compression, before writing data to a storage unit in the primary storage system, in accordance with some embodiments.

FIG. 3 illustrates, in block diagram form, a flow of storage component instantiation and abstraction, of a primary "tier 1" storage system 200 that offers one or more storage-based services, such as data deduplication and/or data compression, before writing data to a storage unit in the primary storage system 200, in accordance with some embodiments. In the following description of FIG. 3, arrows represent component instantiation flow, indicating which component consumes an instantiated component that precedes it. Arrows do not necessarily indicate data flow.

A controller 250 can instantiate Fibre Adapter (FA) director 315A for each Fibre Channel port in the Fibre Channel I/O 225 of the front end 265. FA director 315A is the main interface for clients 100 to interface with primary storage system 200. A host pool 325 of thinly-provisioned storages 305-308 is exposed to the FA directors 315A, for use by clients 100. The thinly-provisioned storages 305-308 in the host pool 325 are available to all controllers 250 within the primary storage system 200. Physical disks 215 and external physical disks 125 provide the physical storage devices that will ultimately be abstracted into the host pool 325 by controllers 250.

Primary storage system 200 comprise internal physical disks 215 and external physical disks 125 (collectively, physical disks). Physical disks can be imported by one or more disk array directors 302 along paths 1*a* and 1*b*.

Disk array directors 302 provide a pool of storages 305-308. Disk array directors 302 can export storages 305-308 to either a host pool 325 or to a service pool 310, along paths 2*a* and 2*b*, respectively. Storages 305-308 can be exposed to host pool 325 or service pool 310 as a single disk, as a file, as a virtual disk, or as a logical unit number (LUN) of storage. Storages, e.g. 305 and 306, that are exported by a disk array director 302 to the host pool 325, can act as storages that are not associated with a storage-based service. Storages 307 and 308 can be exported by a disk array director 302 to a service pool 310 for association with one or more storage-based services.

Service pool 310 can import storages 307 and 308 and instantiate storages 307 and 308, along path 2*b*. Service pool 310 can associate each of 307 and 308 with one or more storage-based services. Storage-based services can include one or more of deduplication, compression, data conversion, or statistical analysis of data to be written to disk. In an embodiment, storages 307 and 308 are both associated with the same one or more storage-based services. In an embodiment, storages 307 and 308 are each associated with one or more storage-based services that can differ from one another.

Fibre Adapter (FA) director 315B can import storages 307 and 308, along path 3. FA director 315B can include a virtualization layer that can instantiate one or more service virtual machines (VM) 316B each having an instance of a guest operating system 317B. A service VM 316B can perform a service associated with a storage, e.g. 307 or 308. In an embodiment, one service VM 316B performs all of the one or more services associated with a storage 307 or 308. Service pool 310 serves as a back end for Service VM 316B.

Service director 320 serves as a front end for service VM 316B. Service director 320 can import, along path 4, storages 307 and 308 that each have one or more storage-based services associated with their respective storage. Service director 320 can instantiate a version of storages 307 and 308 as virtual disks. Service director 320 can then export storages 307 and 308 to host pool 325, along path 5.

Host pool 325 can export storages that have no associated storage-based service, e.g. 305 and 306, and storages that have one or more associated storage-based services, e.g. 307 and 308. Host pool 325 can export, along path 6, thin provisioned versions of storages that are exposed by Fibre Adapter director 315A to clients 100 via front end 265. In an embodiment, front end 265 can communicate with clients 100 by packaging a SCSI command within one or more Fibre Channel frames. There can be an FA director 315A for each Fibre Adapter port within Fibre Channel I/O 225 in front end 265.

Each Fibre Adapter director 315A can comprise a virtualization layer that supports a Fibre Adapter virtual machine (VM) 316A having a guest operating system 317A. FA VM 316A can expose storages, e.g. 305 and 307, to a client 100. A client 100 can access, e.g., storage 307 with FA VM 316A to store data to the primary storage system 200 using the one or more services associated with the storage 307. For example, in an embodiment, data written to storage 307 will be deduplicated and compressed prior to storing the data to primary "tier 1" storage system 200. In an embodiment, data written to storage 307 can be converted from one format to another by Service VM 316B before being written to primary storage system 200. Client 100 can also access, e.g., storage 305 to write data to primary storage system 200 without using an associated storage-based service.

Figure 4:
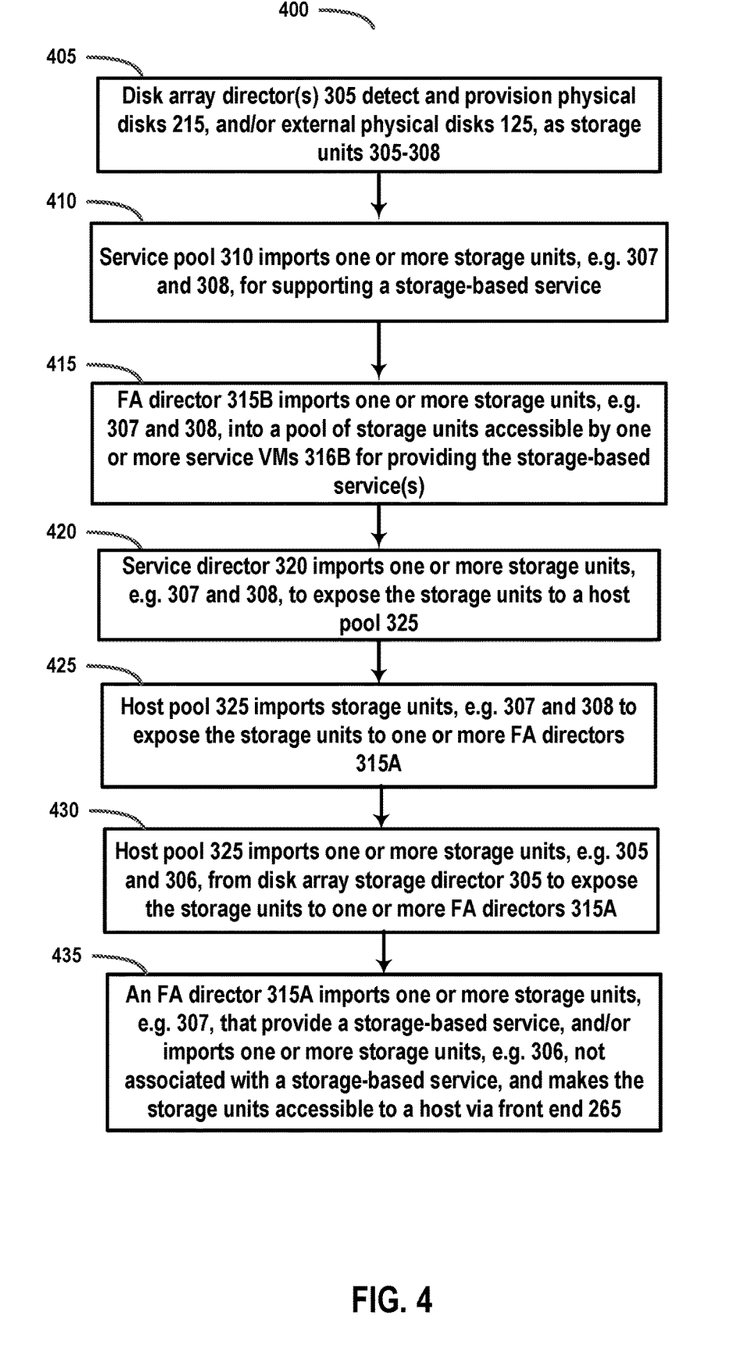
FIG. 4 illustrates a method of providing a storage-based service in a primary "tier 1" storage system that offers one or more storage-based services, such as data deduplication and/or data compression, before writing virtual machine data to a storage unit in the primary storage system, in accordance with some embodiments.

FIG. 4 illustrates a method 400 of providing a storage-based service in a primary "tier 1" storage system that offers one or more storage-based services, such as data deduplication and/or data compression, before writing virtual machine data to a storage unit in the primary storage system, in accordance with some embodiments.

In operation 405, physical disks 215 or external physical disks 125 can be detected and instantiated as storage units 305-308 by disk array directors 302. A storage unit can comprise a physical disk, a file, a virtual disk, or a logical unit number (LUN) of storage.

In operation 410, service pool 310 can import one or more storages, e.g. 307 and 308, can be selected for association with one or more storage-based services. Storage-based services can include deduplication, compression, data conversion, and statistical analysis of the data to be written to the storage. The selected one or more storages 307 and 308 for association with one or more storage-based services can be instantiated in a service pool 310 as storages, e.g. 307 and 308.

In operation 415, a service virtual machine 316B can be instantiated and can import, from the service pool 310, one or more of the storages 307 or 308 associated with one or more storage-based services.

In operation 420, service director 320 can import one or more storage units, e.g. 307 or 308 from Service VM 316B. Service director 320 can provision, e.g. 307 or 308, the one or more disks imported from Service VM 316B as virtual disks within service director 320.

In operation 425, a host pool 325 can import the one or more virtual disks 307 or 308 from service director 320. Host pool 325 can instantiate imported disks 307 or 308 as storages 307 or 308. Disks 307 or 308 are associated with one or more storage-based services.

In operation 430, host pool 325 can import one or more storages, e.g. 305 and 306, from disk array directors 302. Storages 305 and 306 are not associated with a storage-based service.

In operation 435, FA director 315A can import disks from the host pool 325, e.g. storage 305 that is not associated with a storage-based service, and e.g. storage 307 that is associated with one or more storage based services, for exposure to a host device that can access the FA director 315A. In an embodiment, there can be a FA director 315A for each Fibre Channel port in Fibre Channel I/O 225 in the front end of the primary storage system 200.

Figure 5:
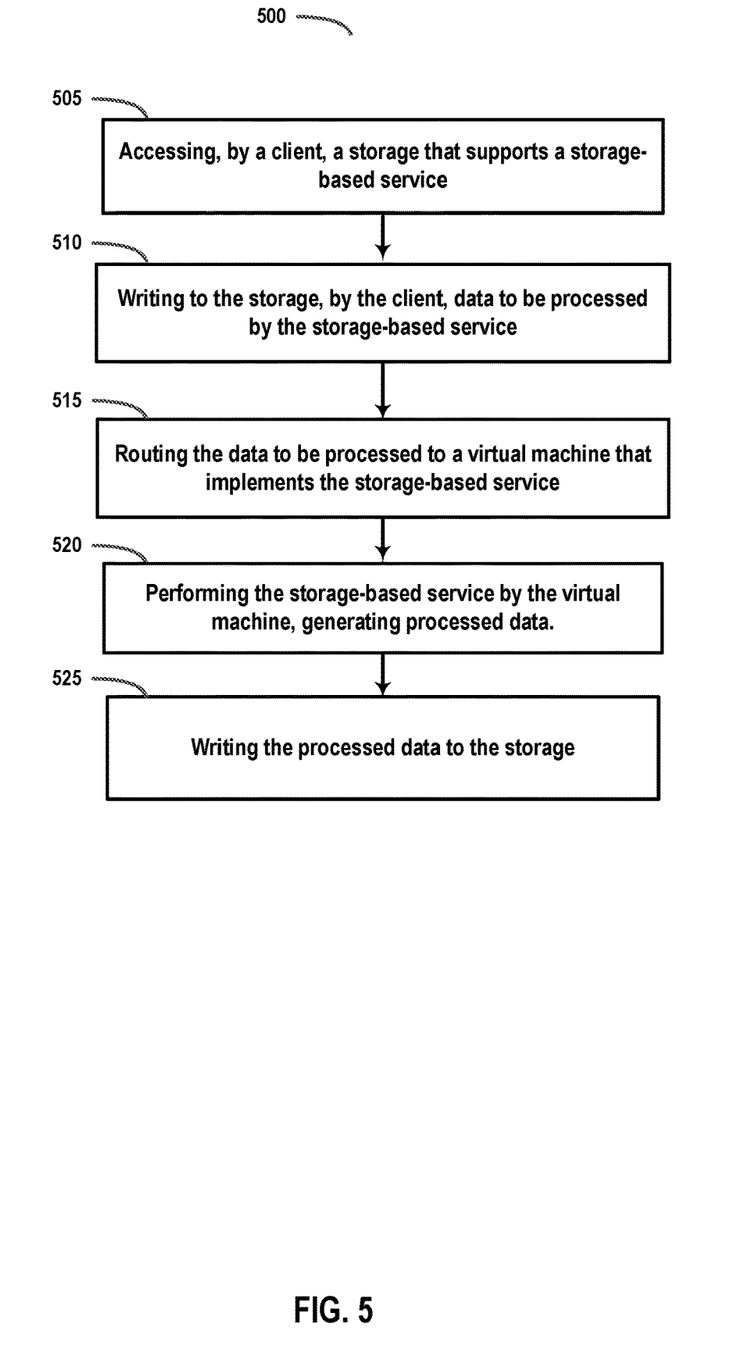
FIG. 5 illustrates a method of using one or more storage-based services in a primary "tier 1" storage that offers one or more storage-based services, such as data deduplication and/or data compression, before writing data to a storage unit in the primary storage system, in accordance with some embodiments.

FIG. 5 illustrates method 500 of using one or more storage-based services in a primary "tier 1" storage that offers one or more storage-based services, such as data deduplication and/or data compression, before writing data to a storage unit in the primary storage system 200, in accordance with some embodiments.

In operation 505, a client 100 can request that FA director 315A access a storage, e.g. 307, that supports one or more storage-based services.

In operation 510, client 100 can write data to storage, e.g. 307, that supports one or more storage-based services.

In operation 515, data to be written to, e.g. storage 307, can be routed by storage controller 250 to service VM 316B that implements the one or more storage-based services associated with the storage, e.g. 307.

In operation 520, service VM 316B can perform the one or more storage-based services associated with the storage, e.g. 307 to generate processed data. In an embodiment, storage-based services can include one or more of deduplication, compression, data conversion, or statistical analysis of the data to be written.

In operation 525, the processed data can be written to storage, e.g. 307.

Figure 6:
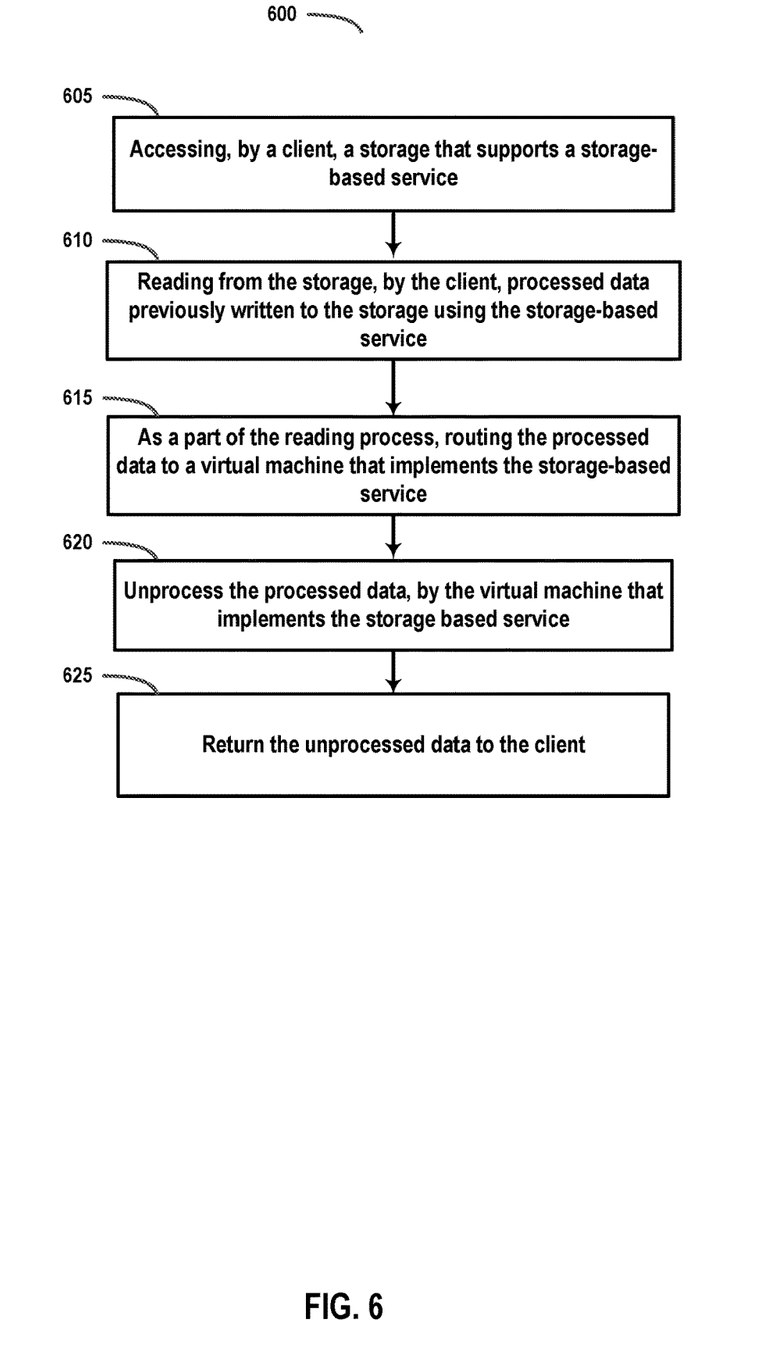
FIG. 6 illustrates a method of using one or more storage-based services in a primary "tier 1" storage that offers one or more storage-based services, such as data deduplication and/or data compression, when reading data from a storage unit in the primary storage system, in accordance with some embodiments.

FIG. 6 illustrates method 600 of using one or more storage-based services in a primary "tier 1" storage that offers one or more storage-based services, such as data deduplication and/or data compression, when reading data from a storage unit in the primary storage system 200, in accordance with some embodiments.

In operation 605, client 100 accesses a storage, e.g. 307, that implements a storage-based service.

In operation 610, client 100 reads processed data from the storage, e.g. 307, previously written to the storage 307 that implements the storage-base service.

In operation, 615, as a part of the reading process, the processed data is routed from the storage, e.g. 307, to the Service VM 316B that implements the storage-based service that produced the processed data.

In operation 620, the Service VM 316B can unprocess the processed data. In an embodiment, if the processed data was deduplicated or compressed before being previously written, unprocessing the processed data comprises Service VM 316B restoring the deduplicated or compressed data to its original, pre-deduplication or pre-compression form, respectively. In an embodiment, if the processed data comprises a data conversion, then unprocessing the processed data can comprise the Service VM 316B returning the converted document. Alternatively, unprocessing the processed data can comprise the Service VM 316B returning the original, unconverted data. In an embodiment, unprocessing the processed data can comprise the Service VM 316B returning the statistical analysis of the data that was analyzed before writing to storage, e.g. 307.

In operation 625, unprocessed data can be returned to the client 100 by the controller 250 routing the unprocessed data from Service VM 316B to FA VM 316A and out to client 100 via front Fibre Channel I/O port 225. In an embodiment, routing the unprocessed data from Service VM 316B to client 100 comprises routing the unprocessed data through Service director 320, host pool 325, FA director VM 316A, and Fibre Channel I/O port 225.

Figure 7:
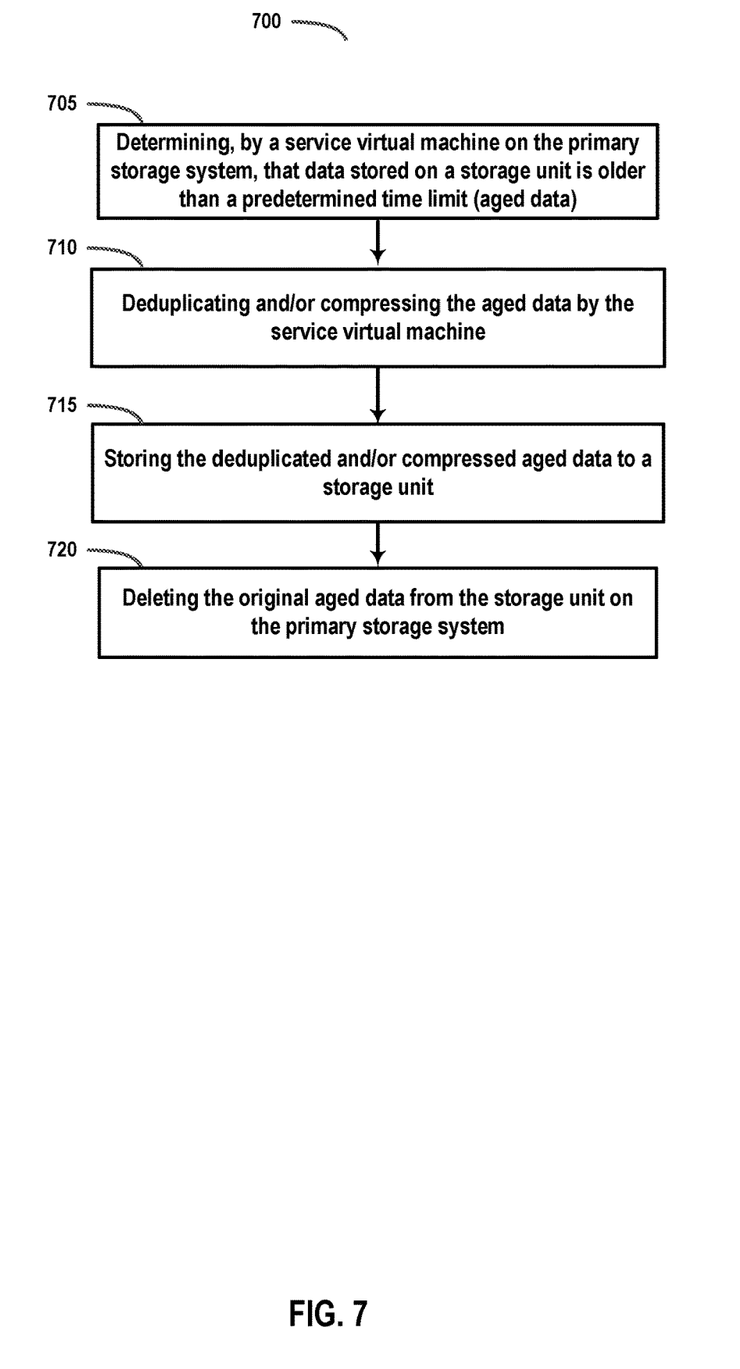
FIG. 7 illustrates a method of deduplicating and/or compressed aged data on a storage unit of the primary storage, in accordance with some embodiments.

FIG. 7 illustrates a method 700 of deduplicating and/or compressed aged data on a storage unit, e.g. 307, of a primary storage system 200, in accordance with some embodiments.

In operation 705, a service VM 316B can determine that data stored in a storage unit, e.g. 307, of the primary storage system 200 is older than a predetermined time limit ("aged data"). In an embodiment, the time limit is predetermined in a storage quality of service policy accessible by the primary storage system 200.

In operation 710, service VM 316B can access storage unit, e.g. 307, and deduplicate and/or compress the aged data.

In operation 715, service VM 316B can store the deduplicated and/or compressed aged data in a storage unit, e.g. 308. In an embodiment, storage unit 308 can be on a different tier of storage, e.g. an external physical disk tier 2 storage 125, than the original data as stored in storage unit, e.g. 307.

In operation 720, service VM 316B can cause the original data in storage unit, e.g. 307, to be deleted.

Figure 8:
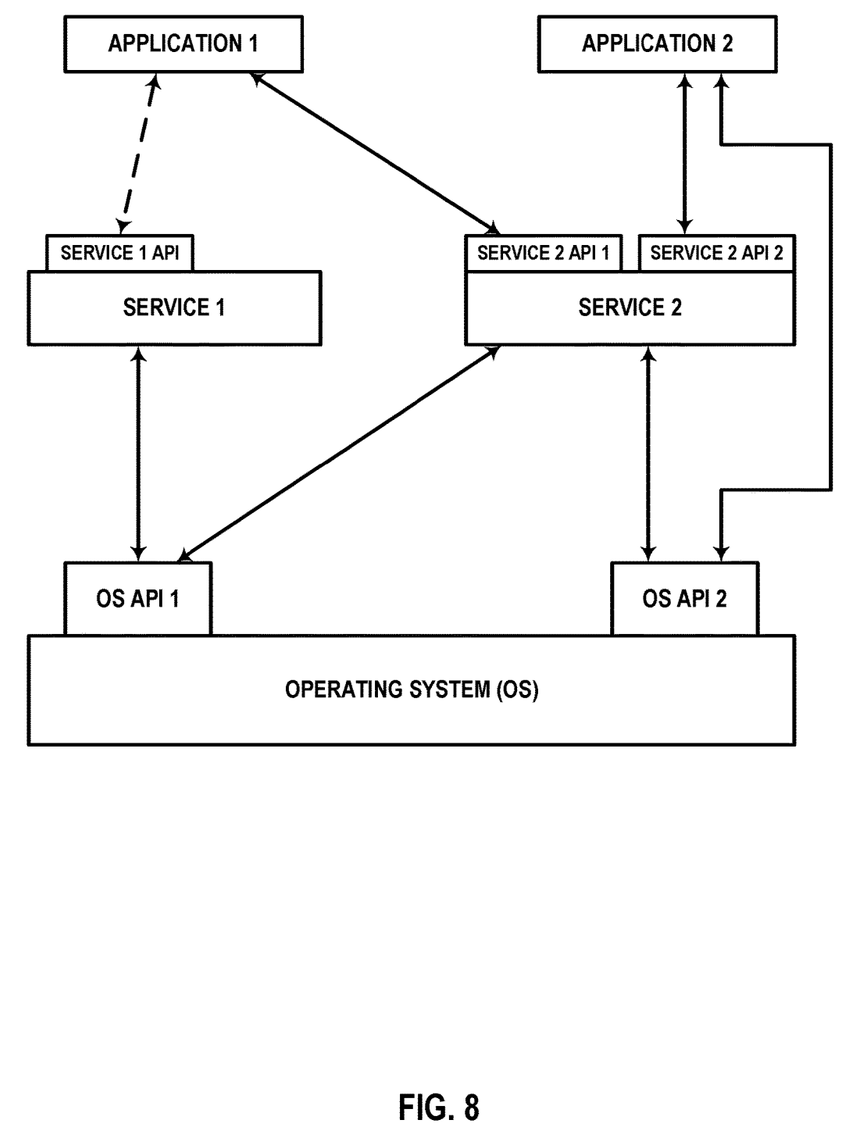
FIG. 8 illustrates an exemplary embodiment of a software stack usable in some embodiments of the invention.

In FIG. 8 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of performing storage-based services upon data read from, or written to, a storage unit of a primary storage system, comprising:
accessing for writing, by a client device, the storage unit of the primary storage system, wherein the storage unit is configured for one of: writing data to be written to the storage unit or performing a storage-based service on the data to be written before writing to the storage unit;
determining whether the storage unit is configured for performing the storage-based service on the data to be written to storage, wherein the determining comprises determining whether a service director of the primary storage system has imported a virtual disk corresponding to the storage unit, the virtual disk instantiated to execute the storage-based service on the data;
in response to determining that the storage unit is configured to perform the storage-based service on the data to be written to the storage unit:
performing, by the primary storage system, the storage-based service on the data to be written prior to writing the data to the storage unit on the primary storage system, wherein the storage-based service comprises one or more of data deduplication or compression, and writing the data to be written to the storage unit comprises storing the deduplicated or compressed data on a storage unit of the primary storage system.

2. The method of claim 1, wherein performing the storage-based service on the data further comprises at least one of: converting the data to another data format, or performing a statistical analysis on the data.

3. The method of claim 2, wherein the storage-based service is performed by a virtual machine on the primary storage system.

4. The method of claim 2, further comprising:
reading, by the client, the data stored to the storage unit after being processed by the storage-based service;
in response to determining that the storage unit is configured to perform the storage-based service on data to be written to the storage unit:
reading, by a virtual machine on the primary storage system, the processed data from the storage unit;
unprocessing, by the virtual machine on the primary storage system, the processed data, wherein unprocessing comprises performing at least one of undeduplicating or decompressing the processed data to be read from the primary storage system; and
returning the unprocessed data to the client.

5. The method of claim 4, wherein the unprocessing comprises:
determining, by a service director of the primary storage system, whether a disk specified in a request to read the data to be unprocessed is associated with a virtual disk instantiated to perform the storage-based service on the data to be read, indicating that the data to be read was previously processed by the storage-based service when the data was written to the primary storage system;

returning the data in its original, unprocessed form, in response to determining that the processed data was generated by deduplication or compression;

returning the processed data, in response to determining that the processed data was generated by converting the data to be written to another data format; and returning the processed data, in response to determining that the processed data was generated by performing a statistical analysis on the data to be written.

6. The method of claim 1, further comprising:

importing, from an external storage device, one or more storage units of the external storage device;

configuring at least one storage unit of the external storage device for writing data to be written to the storage unit;

configuring at least one storage unit of the external storage device for processing the data to be written before writing data to the storage unit of the external storage device.

7. A non-transitory computer readable medium, programmed with executable instructions that, when executed by a processing system, perform operations that implement storage-based services upon data read from, or written to, a storage unit of a primary storage system, the operations comprising:

accessing for writing, by a client device, a storage unit on a primary storage system, wherein the storage unit is configured for one of: writing data to be written to the storage unit or performing a storage-based service on the data to be written before writing to the storage unit;

determining whether the storage unit is configured for performing the storage-based service on the data to be written to storage, wherein the determining comprises determining whether a service director of the primary storage system has imported a virtual disk corresponding to the storage unit, the virtual disk instantiated to execute the storage-based service on the data;

in response to determining that the storage unit is configured to perform the storage-based service on the data to be written to the storage unit:

performing, by the primary storage system, the storage-based service on the data to be written prior to writing the data to the storage unit on the primary storage system, wherein the storage-based service comprises one or more of data deduplication or compression, and writing the data to be written to the storage unit comprises storing the deduplicated or compressed data on a storage unit of the primary storage system.

8. The medium of claim 7, wherein performing the storage-based service on the data further comprises at least one of: converting the data to another data format, or performing a statistical analysis on the data.

9. The medium of claim 8, wherein the storage-based service is performed by a virtual machine on the primary storage system.

10. The medium of claim 9, the operations further comprising:

reading, by the client, the data stored to the storage unit after being processed by a storage-based service;

in response to determining that the storage unit is configured to perform the storage-based service on data to be written to the storage unit:

reading, by a virtual machine on the primary storage system, the processed data from the storage unit;

unprocessing, by the virtual machine on the primary storage system, the processed data; and returning the unprocessed data to the client.

11. The medium of claim 10, wherein the unprocessing comprises:

determining, by the service director of the primary storage system, whether a disk specified in a request to read the data to be unprocessed is associated with a virtual disk instantiated to perform the storage-based service on the data to be read, indicating that the data to be read was previously processed by the storage-based service when the data was written to the primary storage system;

returning the data in its original, unprocessed form, in response to determining that the processed data was generated by deduplication or compression;

returning the processed data, in response to determining that the processed data was generated by converting the data to be written to another data format; and returning the processed data, in response to determining that the processed data was generated by performing a statistical analysis on the data to be written.

12. The medium of claim 7, the operations further comprising:

importing, from an external storage device, one or more storage units of the external storage device;

configuring at least one storage unit of the external storage device for writing data to be written to the storage unit;

configuring at least one storage unit of the external storage device for processing the data to be written before writing data to the storage unit of the external storage device.

13. A processing system, comprising a hardware processor coupled to a memory programmed with executable instructions, that when executed by the processing system, perform operations that implement storage-based services upon data read from, or written to, a storage unit of a primary storage system, the operations comprising:

accessing for writing, by a client device, the storage unit of the primary storage system, wherein the storage unit is configured for one of: writing data to be written to the storage unit or performing a storage-based service the data to be written before writing to the storage unit;

determining whether the storage unit is configured for performing the storage-based service on the data to be written to storage, wherein the determining comprises determining whether a service director of the primary storage system has imported a virtual disk corresponding to the storage unit, the virtual disk instantiated to execute the storage-based service on the data;

in response to determining that the storage unit is configured to perform the storage-based service on the data to be written to the storage unit:

performing, by the primary storage system, the storage-based service on the data to be written prior to writing the data to the storage unit on the primary storage system, wherein the storage-based service comprises one or more of data deduplication or compression, and writing the data to be written to the storage unit comprises storing the deduplicated or compressed data on a storage unit of the primary storage system.

14. The processing system of claim 13, wherein performing the storage-based service on the data further comprises at least one of: converting the data to another data format, or performing a statistical analysis on the data.

15. The processing system of claim 14, wherein the storage-based service is performed by a virtual machine on the primary storage system.

16. The processing system of claim 15, the operations further comprising:
   reading, by the client, the data stored to the storage unit after being processed by the storage-based service;
   in response to determining that the storage unit is configured to perform the storage-based service on data to be written to the storage unit:
      reading, by a virtual machine on the primary storage system, the processed data from the storage unit;
      unprocessing, by the virtual machine on the primary storage system, the processed data, wherein unprocessing comprises performing at least one of undeduplicating or decompressing the processed data to be read from the primary storage system; and
      returning the unprocessed data to the client.

17. The processing system of claim 16, wherein the unprocessing comprises:
   determining, by the service director of the primary storage system, whether a disk specified in a request to read the data to be unprocessed is associated with a virtual disk instantiated to perform the storage-based service on the data to be read, indicating that the data to be read was previously processed by the storage-based service when the data was written to the primary storage system;
   returning the data in its original, unprocessed form, in response to determining that the processed data was generated by deduplication or compression;
   returning the processed data, in response to determining that the processed data was generated by converting the data to be written to another data format; and
   returning the processed data, in response to determining that the processed data was generated by performing a statistical analysis on the data to be written.

18. The processing system of claim 13, the operations further comprising:
   importing, from an external storage device, one or more storage units of the external storage device;
   configuring at least one storage unit of the external storage device for writing data to be written to the storage unit;
   configuring at least one storage unit of the external storage device for processing the data to be written before writing data to the storage unit of the external storage device.

* * * * *